US007387091B2

(12) United States Patent
Ritter

(10) Patent No.: US 7,387,091 B2
(45) Date of Patent: *Jun. 17, 2008

(54) PROCESS FOR USE WITH DUAL-FUEL SYSTEMS

(75) Inventor: Gregory W. Ritter, Gillette, WY (US)

(73) Assignee: TGI, Inc., Gillette, WY (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/671,843

(22) Filed: Feb. 6, 2007

(65) Prior Publication Data

US 2007/0125321 A1    Jun. 7, 2007

Related U.S. Application Data

(63) Continuation-in-part of application No. 11/099,726, filed on Apr. 6, 2005, now Pat. No. 7,225,763, which is a continuation of application No. 10/797,803, filed on Mar. 10, 2004, now Pat. No. 6,901,889.

(51) Int. Cl.
*F02B 3/00* (2006.01)
*F02M 21/02* (2006.01)

(52) U.S. Cl. .................. 123/27 GE; 123/525; 123/672

(58) Field of Classification Search ........... 123/27 GE, 123/525–528, 434, 435, 681–684
See application file for complete search history.

(56) References Cited

U.S. PATENT DOCUMENTS

| | | | |
|---|---|---|---|
| 3,792,690 A | 2/1974 | Cooper | |
| 4,391,095 A | 7/1983 | Virk | |
| 4,535,728 A | 8/1985 | Batchelor | |
| 4,597,364 A | 7/1986 | Young | |
| 4,958,598 A | 9/1990 | Fosseen | |
| 5,526,797 A * | 6/1996 | Stokes | 123/575 |
| 5,546,908 A * | 8/1996 | Stokes | 123/480 |
| 5,765,656 A | 6/1998 | Weaver | |
| 6,095,102 A | 8/2000 | Willi et al. | |
| 6,145,495 A | 11/2000 | Whitcome | |
| 6,189,523 B1 | 2/2001 | Weisbrod et al. | |
| 6,202,601 B1 | 3/2001 | Ouellette et al. | |
| 6,286,482 B1 | 9/2001 | Flynn et al. | |
| 6,422,015 B2 | 7/2002 | Long | |
| 6,543,395 B2 | 4/2003 | Green | |
| 6,550,430 B2 * | 4/2003 | Gray | 123/27 GE |
| 6,598,584 B2 * | 7/2003 | Beck et al. | 123/299 |
| 6,863,034 B2 * | 3/2005 | Kern et al. | 123/3 |

(Continued)

*Primary Examiner*—John T Kwon
(74) *Attorney, Agent, or Firm*—Marsh Fischmann & Breyfogle LLP

(57) ABSTRACT

A system and method is provided to reduce the occurrence of engine knock for engines that utilize a dual-fuel fumigation system. Typically, dual fuel systems inject a gaseous-fuel flow into the air intake stream of a diesel engine. This results in more complete combustion within the engine as well as reduced diesel fuel usage. Such dual fuel systems are susceptible to engine knocking due to premature detonation of the gaseous fuel air intake mixture that is often caused by sudden changes to the operating conditions of the engine. The present system utilizes a knock sensor to identify early stages of such engine knocking. To eliminate such engine knocking conditions, the system temporarily interrupts the gaseous fuel flow to resume operation in full diesel mode. The gaseous fuel flow is then reestablished based on the present operating conditions of the engine.

25 Claims, 4 Drawing Sheets

U.S. PATENT DOCUMENTS 6,892,531 B2 5/2005 Rim
7,036,482 B2 * 5/2006 Beck et al. .................. 123/229
2003/0077210 A1 4/2003 Nau et al.
2004/0123849 A1 7/2004 Bryant
2004/0177837 A1 9/2004 Bryant

* cited by examiner

PROCESS FOR USE WITH DUAL-FUEL SYSTEMS

CROSS REFERENCE TO RELATED APPLICATIONS

This application is a continuation in part of U.S. patent application Ser. No. 11/099,726 filed on Apr. 6, 2005, now U.S. Pat. No. 7,225,763, which is a continuation of U.S. patent application Ser. No. 10/797,803 filed on Mar. 10, 2004, now U.S. Pat. No. 6,901,889.

FIELD OF THE INVENTION

The present invention relates generally to dual-fuel engine systems. More particularly, the present invention relates to a process for controlling a dual-fuel engine system to reduce and/or substantially eliminate engine knocking.

BACKGROUND

Due to the high thermal efficiency achieved by compression-ignited engines (e.g., in comparison with spark-ignited engines), such engines are commonly utilized in industrial applications. Further, due to increasing fuel costs, such engines are also gaining popularity in the passenger vehicle and light truck markets. The high efficiency of compression-ignited engines, such as diesel engines, is due in part to the ability to use higher compression ratios than spark-ignited engines (i.e., gasoline engines) as well as the ability to control power output without a throttle. In the latter regard, the lack of a throttle eliminates throttling losses of premixed charges typical in spark-ignited engines thereby resulting in significantly higher efficiency at part load. However, compression-ignited engines and diesel engines in particular typically cannot achieve the low oxides of nitrogen ($NO_x$) and particulate emission levels that are possible with spark-ignited engines.

Diesel engines typically inject diesel fuel into the engine's combustion chamber when that chamber's piston is near the end of the compression stroke. The high pressure present in the chamber ignites the diesel fuel. Due to the injection mixture of diesel fuel and compressed intake air within the combustion chamber, a large fraction of the fuel exists at a very fuel-rich equivalence ratio. That is, the fuel and air in the combustion chamber are not necessarily a homogenous mixture. This may result in incomplete combustion of the diesel fuel, which tends to result in high particulate emissions. Furthermore, the fuel-rich equivalence ratio can also lead to high flame temperatures in the combustion process, which results in increased $NO_x$ emissions. As tougher environmental standards are being enacted for all internal combustion engines, users of diesel engines are looking for ways to lower emissions. One solution is to reduce the amount of diesel injected into the combustion chamber, which reduces the equivalence ratio and works to reduce particulate and $NO_x$ emissions. Such a reduction in injected diesel, however, reduces engine power.

Utilization of gaseous-fuels with diesel engines provides for more complete combustion of any diesel fuel consumed, can enhance fuel economy, and typically results in lower engine emissions. That is, in order to reduce particulate and $NO_x$ emissions levels from diesel engines and/or to increase fuel economy, such engines may be partially or completely converted for use with gaseous-fuels such as, compressed natural gas (CNG), liquid natural fuels (LNG) such as ethanol, and liquid or liquefied petroleum gas (LPG), such as propane. However, such gaseous-fuels typically do not alone have the centane value required to allow for their ignition through compression. Accordingly, diesel engines must be modified to use such fuels.

Methods for converting a diesel engine to consume gaseous-fuels typically fall into three categories. The first is to convert the engine to a spark-ignited engine; a second is to convert the engine to allow for the direct injection of gaseous-fuels into the combustion chamber with injected diesel; and a third is a dual-fuel technology, in which the gaseous-fuel is mixed with all or a portion of the intake air of the engine. As will be appreciated, the second and third methods utilize injected diesel (i.e., pilot diesel) to ignite the gaseous-fuel. In this regard, the combustion of the gaseous-fuel results in more complete combustion of the injected diesel. Furthermore, as the gaseous-fuel allows the engine to produce additional power less diesel is injected into the engine.

Conversion to a spark-ignition system and/or a direct gaseous-fuel injection system for utilizing gaseous-fuels with a diesel engine each typically require substantial modification to the diesel engine. Such modifications may include replacement of cylinder heads, pistons, fuel injection system and/or duplication of many engine components (e.g., injection systems). Accordingly, these systems are typically expensive and oftentimes unreliable. On the other hand, dual-fuel systems require little modification to existing engines.

Dual-fuel operation where gaseous-fuels are mixed with intake air prior to the introduction of that air-fuel mixture into the cylinders of the engine is known in the art as fumigation. That is, the mixture of gaseous-fuel and intake air is introduced into each cylinder of the engine during the intake stroke. During the compression stroke of the cylinder piston, the pressure and temperature of the mixture are increased. Near the end of the compression stroke, a small quantity of pilot diesel fuel from the engine's existing diesel fuel injection system is injected into the cylinder. The pilot diesel ignites due to compression and in turn ignites the mixture of gaseous-fuel and intake air. As will be appreciated, such fumigation systems may be retrofit onto existing diesel engines with little or no modification of the existing engine. Furthermore, engines using such fumigation systems may typically be operated in a dual-fuel mode or in a strictly diesel mode (e.g., when gaseous-fuel is not available).

SUMMARY OF THE INVENTION

The inventors of the present invention have recognized that dual-fuel systems are often susceptible to engine knocking at high load operating conditions and/or in response to rapid changes in operating conditions of the engine. Such engine knocking is an uncontrolled combustion process that can damage engines and is typically caused by elevated temperature and pressure in the engine during the compression strokes that makes the intake air/gaseous-fuel mixture susceptible to premature detonation (i.e., engine knocking).

The occurrence of engine knocking in dual-fuel systems is particularly acute for engines that run at varying load levels during operation (e.g., on-road and off-road vehicles). That is, due to the changes in operating conditions, the load applied to the engine may increase or decrease rapidly. Accordingly, the mixture of gaseous fuel and intake air that was appropriate prior to a change in operating conditions may be excessively rich or excessively lean after the change in operating conditions. This may lead to the mixture being out of balance for the current operating conditions and thus the initiation of engine knocking. Further, such engine knocking may increase in intensity (e.g., oscillation due to harmonic amplification) and can result in the engine shaking and/or jumping (i.e., rough engine operation) while the gaseous fuel/intake air mixture is readjusted for the current operating conditions.

To prevent such rough engine operation, which can temporarily reduce engine performance and/or damage the engine, the inventors have determined it is desirable to identify engine knocking at early stages and rapidly readjust the ratio of gaseous fuel to intake air. Accordingly, systems and methods (i.e., utilities) are presented herein for operating a dual-fuel system while reducing the occurrence, duration and/or intensity of engine knocking conditions. More specifically, the utilities herein utilize an engine knock sensor to identify engine knocking conditions such that remedial measures may be taken.

According to a first aspect of the present invention, a gaseous fuel fumigation system for use with a diesel engine is provided. The system includes a first valve disposable in a flow path between a gaseous fuel supply and an air intake of a diesel engine. The first valve is operative to regulate a flow volume of gaseous fuel through the flow path. The system further includes a knock sensor that is operative to monitor a motion level (e.g., vibrations and/or acceleration) of the diesel engine and generate an output signal that is indicative of the motion level. Finally, the system includes a controller that is operative to receive the output signal from the knock sensor and compare the output signal to at least a first threshold value. If the output signal of the knock sensor exceeds the first threshold value, the controller generates control signals that are operative to: move the first valve from its current or initial open position, which defines a first gaseous fuel flow volume, to a substantially closed position, which defines a second gaseous fuel flow volume, and back to a reopened position, which defines a third gaseous fuel flow volume. Stated otherwise, the controller is operative to cycle the first valve from its current open position to a substantially or fully closed position and back to a reopened position. Such movement may be substantially continuous and may permit reestablishing gaseous-fuel flow based on present engine operating conditions.

Various refinements exist of the noted features in relation to the subject first aspect. These refinements and/or additional features may exist individually or in any combination. For instance, the gaseous-fuel system may be interconnected to any of a variety of differently configured diesel engines. That is, such a system may be incorporated into heavy industrial application engines (e.g., railroad engines), power generation systems and/or passenger vehicles and off-road vehicles. Furthermore, such a system may be incorporated into original equipment manufacturer (OEM) equipment, or, such a system may be retrofit onto an existing diesel engine. Additionally, it will be noted that the gaseous-fuel may be injected into the air stream of an engine in any appropriate manner. In this regard, the flow path may be directly coupled to an air intake stream in order to directly inject fuel into that stream, or, and outlet of the flow path may be disposed relative to an air intake such that the gaseous-fuel is drawn into the engine with ambient air.

As used herein, the term valve is meant to include any mechanism for varying the flow of a fluid through a flow path. Such valves include, without limitation, mechanical valves operative to restrict a cross-sectional area of a flow path as well as pressure regulating valves that are operative to reduce the pressure and/or volume of a gas passing across the valve. Accordingly, the pressure of the gaseous-fuel supply and/or the size (i.e., cross-sectional size) of the flow path may be selected for a particular application.

Cycling of the first valve allows the engine to momentarily run in near or full diesel mode. That is, while the valve is substantially closed, the engine operates free or substantially free of gaseous fuel flow. Accordingly, while running in full/near full diesel mode, the knocking conditions caused by an out of balance mixture of gaseous-fuel and intake air are eliminated. Accordingly, the first valve may be reopened based on the present operating conditions of the diesel engine. In this regard, it will be appreciated that the flow volumes associated with the initial valve position and the reopened valve position may be different. By cycling the valve upon initially identifying the knocking conditions, visibly rough engine operation may be totally avoided. Furthermore, as the valve is reopened almost immediately after being closed, the benefits of dual fuel operation are only briefly interrupted.

In one arrangement, the position of the first valve is adjusted based on an oxygen content of the exhaust stream of the diesel engine. In such an arrangement, the system may further include an oxygen sensor that is disposable within the exhaust path of the diesel engine. An oxygen content value generated by this oxygen sensor may be received by the controller. Accordingly, the controller may utilize the oxygen content value to control the position of the first valve. Likewise, the controller may utilize this oxygen content value to establish a reopened position for the first valve. Accordingly, an appropriate gaseous fuel flow may be established for the present/current operating conditions of the engine.

The knock sensor may be any sensor that is operative to provide an output indicative of movement associated with engine knocking. For instance, various different accelerometers and/or velocity sensors may be utilized. Furthermore, it will be appreciated that a plurality of such sensors may be utilized. In this regard, a knock sensor may be positioned adjacent to each cylinder of the engine to provide information regarding early states of engine knocking. In one arrangement, the knock sensor is a piezoelectric device. However, it will be appreciated that other types of devices may be utilized, without limitation. In any case, it may be desirable that the knock sensor is attached to a solid surface of the engine (e.g., head and/or block) such that, for example, high frequency oscillations (e.g., vibrations) associated with engine knocking may be detected.

In another arrangement, a second valve is disposed in the flow path between the gaseous fuel supply and the air intake stream of the diesel engine. The second valve is operative to regulate the flow volume of the gaseous fuel through the flow path based on a load level associated with the engine. In one particular embodiment, this load level is determined from boost pressure produced by a turbo-charger attached to the diesel engine. In this regard, the boost pressure may be utilized to open a spring-actuated valve to variably open a flow path through the valve. As will be appreciated, as the engine load level increases, the boost pressure also increases. This increased boost pressure may further open the second valve such that increased flow volume of gaseous-fuel may pass through. As will be appreciated, use of such a spring-actuated valve may allow for preventing the passage of any gaseous-fuel through the second valve until a predetermined boost pressure is achieved. Furthermore, the second valve may be adjustable to allow a user to establish the engine load level necessary to initially and/or fully open the valve. Though discussed in relation to a spring-actuated valve, it will be appreciated that other valve types may be utilized and may be opened/closed based on other engine load level indicators. For example, an electronically actuated valve (e.g., using a stepper motor) operative in relation to the engine's governor and/or an RPM sensor may also be utilized to establish a gaseous-fuel flow volume based on an engine load level.

The controller may further include programming (e.g., software, hardware and/or firmware) for use in controlling and/or maintaining one or more operating parameters/conditions for the engine. For instance, the controller may be operative to maintain at least a predetermined minimum oxygen content in the oxygen stream. For example, if the exhaust stream is oxygen depleted (i.e., beneath a predetermined desired amount), unburned hydrocarbons are passing through the engine and hence, increasing emissions outputs. The controller may be operative to adjust the gaseous-fuel flow volume through the first valve (e.g., reduce the volume) to reestablish a desired oxygen content in the exhaust stream. Accordingly, ensuring that at least a minimum desired oxygen content is present within the exhaust gases allows for ensuring complete combustion of the gaseous-fuel and/or diesel fuel within the engine.

The threshold value to which the output signal the motion sensor is compared may be generated by the controller during the operation of the engine. For instance, the threshold value may be determined as an average motion value over a preceding and predetermined period of time. Alternatively, the threshold value may be a predetermined threshold value that may be stored in a storage structure. In this regard, the threshold values may include, inter alia, tabulated threshold values and/or threshold value equations for calculating an appropriate threshold based on one or more current operating conditions of the engine.

According to another aspect of the present invention, a method for use of a gaseous fuel fumigation system with a diesel engine is provided. The method includes establishing a gaseous fuel flow through a first valve disposed between a gaseous fuel supply and an air intake stream of a diesel engine. The first valve is operative for regulating a volume of the gaseous fuel flow. A motion level of the engine is monitored and, upon the motion exceeding at least one threshold value, the first valve is substantially closed and reopened to at least partially interrupt the flow of gaseous fuel to the diesel engine.

Various refinements exist of the noted features in relation to the present aspect. These refinements and/or additional features may exist individually or in any combination. For instance, the valve may be entirely closed and then reopened, or the valve may be substantially closed in relation to its initial flow volume. What is important is that the flow volume of gaseous fuel to the diesel engine is substantially reduced to establish full or rear full diesel operation to reduce the motion level of the engine (e.g., to eliminate knocking conditions).

Generally, monitoring a motion level of the engine includes generating an output signal from a motion sensor that is attached to the engine. This output signal may then be compared to one or more threshold values to determine if the current motion of the engine is acceptable and/or exceeds the threshold value. If the output signal exceeds the threshold value (e.g., by a predetermined amount), remedial measures may be taken. That is, the first valve may be cycled to temporarily interrupt the supply of gaseous fuel to the engine. In this regard, closing and reopening the valve may include generating a first valve control signal that is operative to move the valve from an initial valve position to a substantially closed position and generating a second control signal that is operative to move the valve from the substantially closed position to a reopened position. The reopened position of the valve may be based on one ore more current operating conditions of the engine. In one arrangement, the reopened position may be defined based at least in part on the oxygen content of the exhaust gas of the engine.

BRIEF DESCRIPTION OF THE DRAWINGS

FIG. 2b illustrates a second cross-sectional view of the boost-pressure valve of FIG. 2a;

DETAILED DESCRIPTION

Figure 1:
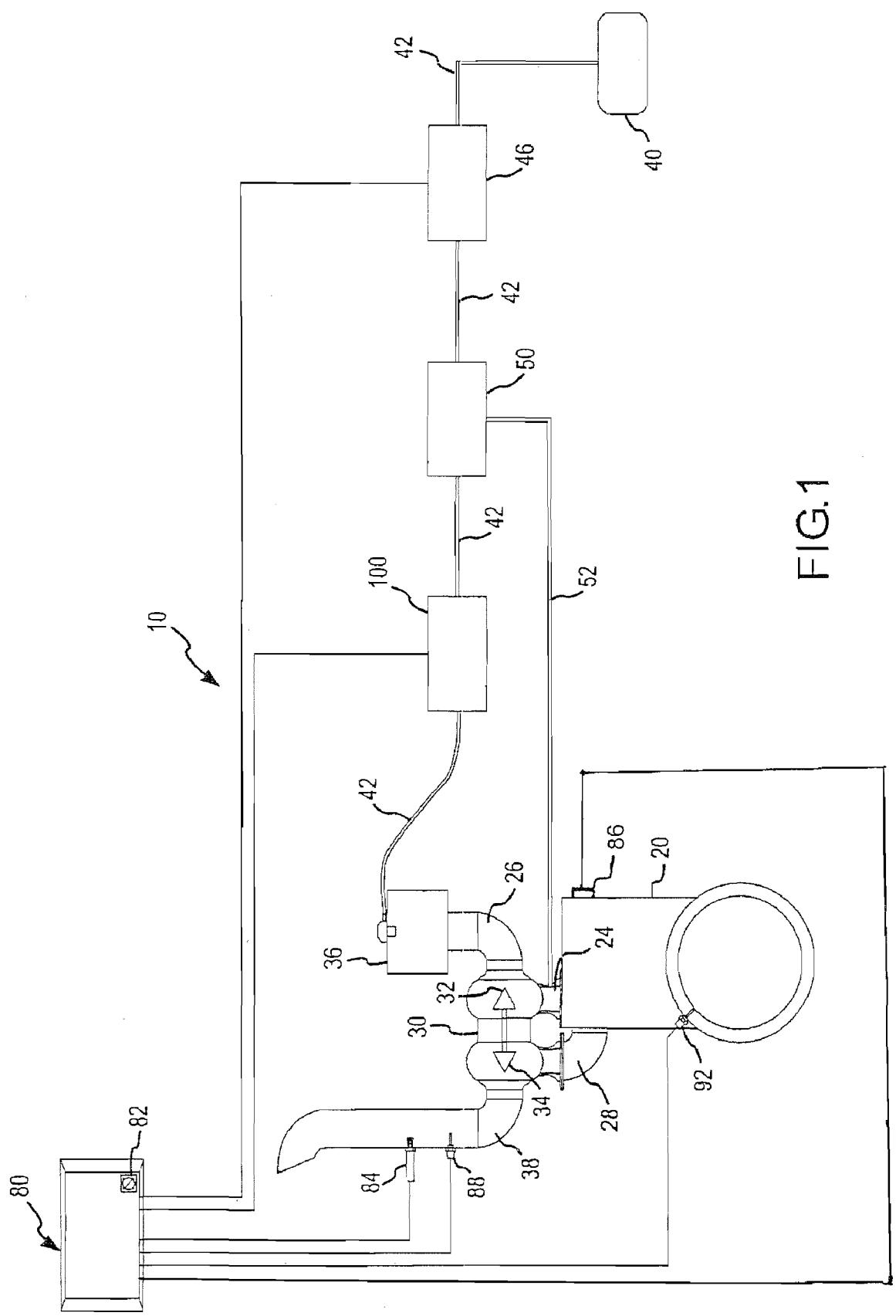
FIG. 1 is a schematic view of a first embodiment of a fumigation system.

The present invention will now be discussed in relation to the accompanying drawings, which at least partially assist in illustrating its various pertinent features. FIG. 1 shows a schematic view of a first embodiment of a dual-fuel fumigation system 10 interconnected to a turbocharged diesel engine 20. The fumigation system 10 is applicable to a variety of diesel engine applications and may be utilized in any of a variety of environments where diesel engines are utilized. For example, the fumigation system 10 may be utilized with stationary power generation systems as well as on-road and off-road diesel powered vehicles. That is, the system may be utilized with diesel engines designed to operate at a set load level as well as with diesel engines having varying load requirements due to, for example, idling needs, acceleration needs, cruising needs, etc. Furthermore, it will be noted that the fumigation system 10 is discussed in relation to its applicability to turbocharged diesel engines, however, it will be appreciated that certain aspects of the invention are not limited to such applications.

The particular internal characteristics of the turbocharged internal combustion engine 20 are not of particular importance for the present invention. In this regard, it will be noted that the fumigation system 10 may be interconnected to a multitude of differently configured diesel engines 20. As shown, the engine 20 includes a turbocharger 30, which provides pressurized intake air to the engine 20 during operation at load. The turbocharger 30 includes an impeller 32 that is interconnected to a turbine 34. The impeller 32 is disposed within an air inlet line 26 of the engine 20 while the turbine 34 is disposed within an exhaust output 38 of the engine 20. As is conventional, the turbine 34 receives exhaust gas from an exhaust manifold 28 of the diesel engine 20. The exhaust gas rotates the blades of the turbine 34, which causes the impeller 32 to likewise rotate, thereby compressing air supplied to the impeller 32 through the air inlet line 26. The compressed air is discharged from the impeller 32 through the inlet manifold 24 where it is supplied to air inlet ports within the diesel engine 20. By means of the turbocharger 30, air supplied to the engine 20 is compressed, which enhances the performance of the engine 20.

The exact internal configuration of the engine diesel 20 is unimportant for the present invention as the gaseous fumigation system 10 disclosed herein may be interconnected to a variety of differently configured engines. Typically, the engine 20 will include a number of cylinder assemblies, each having an intake port, an exhaust port, and a fuel injector therein. Each cylinder assembly will further include a piston for compressing gasses within the cylinder. The fuel injector is utilized to inject diesel fuel into the cylinder (e.g., when the piston is at or near top dead center), causing combustion of the fuel/air mixture.

Irrespective of the exact configuration of the diesel engine 20, the engine 20 may be equipped and/or retrofit with the dual-fuel fumigation system 10. As shown in FIG. 1, the fumigation system includes a gaseous-fuel supply 40 for providing a fuel flow to the air intake 36 of the engine 20 via a gas supply conduit 42. Of note, the outlet of the gas supply conduit 42 may be disposed relative to the air intake 36 such that gas emitted from the end of this gas supply conduit 42 may be drawn into the air intake 36. In this regard, the gaseous-fuel may pass through a filter associated with the air intake 36 prior to entering the engine 20. As will be discussed herein, a series of three valves are disposed between the gaseous-fuel supply 40 and the air intake 36. It will be noted that other embodiments, the fumigation system may utilize the valves in different order and/or combine the functioning of two or more valves into a single valve assembly.

In the present embodiment, the three valves include a lock-off valve 46, a boost-pressure valve 50, and a leaning valve 100. The boost-pressure valve 50 is a mechanical valve that opens in relation to boost-pressure received from the turbocharger 30 via a boost-pressure conduit 52. The lock-off valve 46 and the leaning valve 100 are interconnected to a programmable electronic control unit 80. As shown, the programmable electronic control unit (ECU) 80 is further interconnected to an oxygen sensor 84 disposed within the exhaust output 38 of the engine 20, an exhaust gas temperature (EGT) sensor 88, which is also disposed within the exhaust output 38, and an RPM sensor 92, which is operative to determine the engine speed at the flywheel. Further, a knock sensor for detecting motion levels of the engine 20 is also interconnected to the ECU 80, as will be discussed herein.

The lock-off valve 46 is operative to prevent any gas flow between the gaseous-fuel supply 40 and the air intake 36 when the engine 20 is not operating. That is, when the electrical system of the engine 20 is inactive, the lock off valve 46 is closed to prevent the typically pressurized gaseous-fuel 40 from traveling through the gas supply conduit 42. Of note, the gaseous-fuel supply 40 may further include regulators in order to provide a predetermined gas pressure to the conduit 42. Furthermore, it will be noted that the size of the gas supply conduit 42 and/or pressure of the gaseous-fuel may be selected to provide a desired flow rate/volume based on one or more requirements of the engine 20.

Figure 2A:
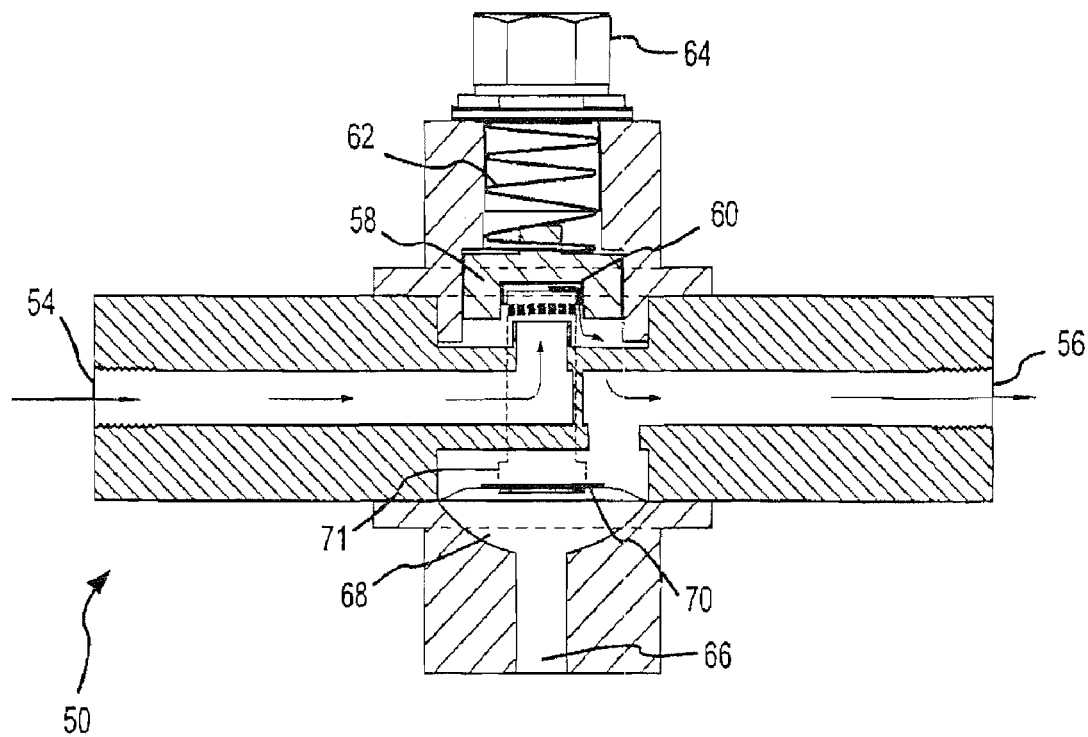
FIG. 2a illustrates a first cross-sectional view of a boost-pressure valve utilized with the system of FIG. 1.

Upon starting the engine 20, the lock off valve 46 is opened to allow gaseous-fuel flow between the gas supply 40 and the boost-pressure valve 50. FIG. 2a shows a cross-sectional view of the boost-pressure valve 50. As shown, the boost-pressure valve 50 includes a gas inlet 54 and a gas outlet 56. Disposed between the inlet 54 and the outlet 56 is a diaphragm operated valve assembly. The valve assembly includes a valve body 58, a valve seat 60, a spring 62, and a spring tension adjuster 64. As shown, the valve body 58 and valve seat 60 are generally cylindrical and are disposed in a mating relationship when boost pressure is not present. That is, the spring 62 maintains the valve body 58 against valve seat 60 in the absence of boost pressure from the turbocharger 30, thereby preventing flow of gas through the main portion of the boost-pressure valve 50.

The boost-pressure conduit line 52 has a first end interconnected to the turbocharger 30 and a second end interconnected to the boost-pressure inlet 66 of the boost-pressure valve 50. The boost-pressure inlet 66 is connected to a pressure chamber 68 that is partitioned by a flexible diaphragm 70. The pressure within the pressure chamber 68 from the turbocharger 30 applies upward pressure to the diaphragm 70. The diaphragm 70 is interconnected to the valve body 58 by a pushrod 71. When upward pressure is sufficient, the diaphragm 70 moves upward and the pushrod 71 lifts the valve body 58 from the valve seat 60, thereby opening a fluid path between the gas inlet 54 and outlet 56. That is, when the boost pressure in the pressure chamber 68 overcomes the force applied to the valve body 58 by the spring 62, gaseous-fuel from the gaseous-fuel supply 40 may be delivered through the boost-pressure valve 50 and on to the air intake 36 via the leaning valve 100. As will be appreciated, as the boost pressure increases, the spring 62 and valve seat 60 may be further displaced, thereby progressively increasing the flow of gaseous-fuel through the boost-pressure valve in response to changes in engine operating conditions. Further, the adjustor 64 allows for setting a minimum boost pressure that will open the boost-pressure valve 50.

Figure 2B:
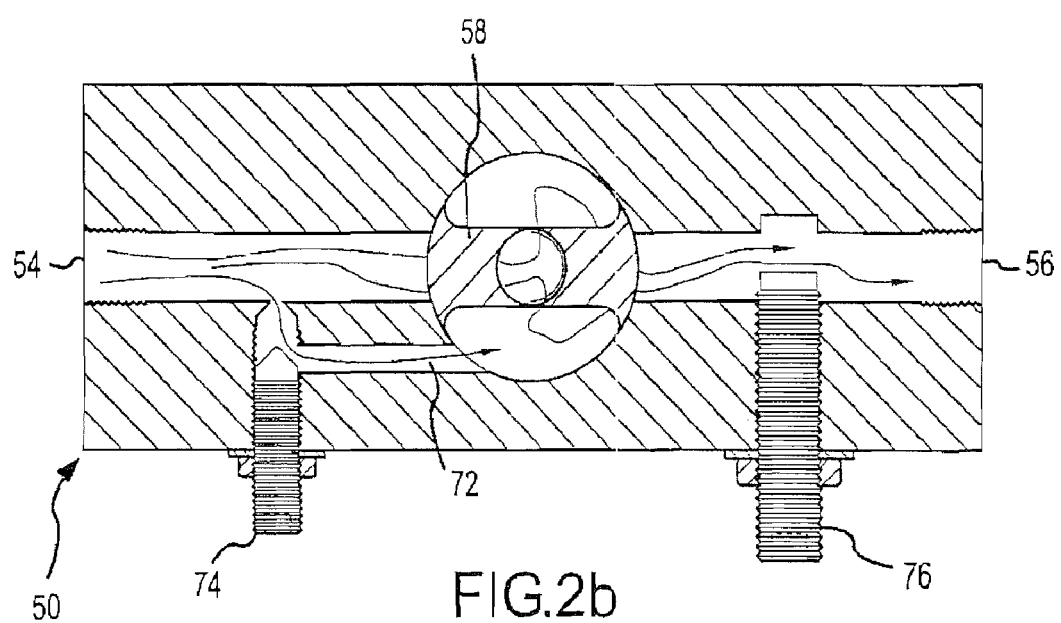

At low load levels, the diesel engine 20 does not produce boost pressure and likewise cannot open the boost-pressure valve 50. In this regard, at low engine loads such as idle, no gaseous-fuel is able to pass through the main portion of the boost-pressure valve 50. However, the present configuration of the boost-pressure valve 50 includes an idle bypass port 72. As shown in FIG. 2b, a portion of the gas flow passing through the boost-pressure valve 50 may pass through the idle bypass port 72, through the main valve body and through the outlet 56 while the valve body 58 is seated on the valve seat 60. Furthermore, in the embodiment shown, the idle bypass port 72 includes an idle bypass adjustment screw 74. This idle bypass adjustment screw 74 allows for varying the flow of the gaseous-fuel through the boost-pressure valve 50 when the boost pressure is insufficient to open the main valve assembly. In this regard, gaseous-fuels may be provided to the engine at low load levels such that the benefits of the gaseous-fuel injection (e.g., reducing $NO_x$ and/or particulates) may be realized at low load settings. Stated otherwise, the idle by-pass port 72 may be set to maintain a minimum gas flow through the boost pressure valve 50.

FIGS. 2a and 2b illustrate the flow of the gaseous-fuels through the boost-pressure valve 50. As shown in FIG. 2b, the gaseous-fuel enters the gas inlet 54 from the left side of the valve 50 and passes through the main valve assembly. Returning to FIG. 2a, it will be noted that when the valve assembly is open, the gaseous-fuel passes up through the center portion of the valve 50 and out through the outlet 56. Furthermore, it will be noted in FIG. 2b that the boost-pressure valve 50 includes a fuel mix adjuster screw 76 that is operative to limit the maximum flow of the gaseous-fuel through the boost-pressure valve 50. In this regard, the boost-pressure valve 50 may be utilized with engines having varying flow requirements. That is, when the boost pressure fully opens the main valve assembly, the fuel mix adjuster screw 76 may be set for a particular engine such that a desired maximum flow through the boost-pressure valve 50 is established.

Figure 3:
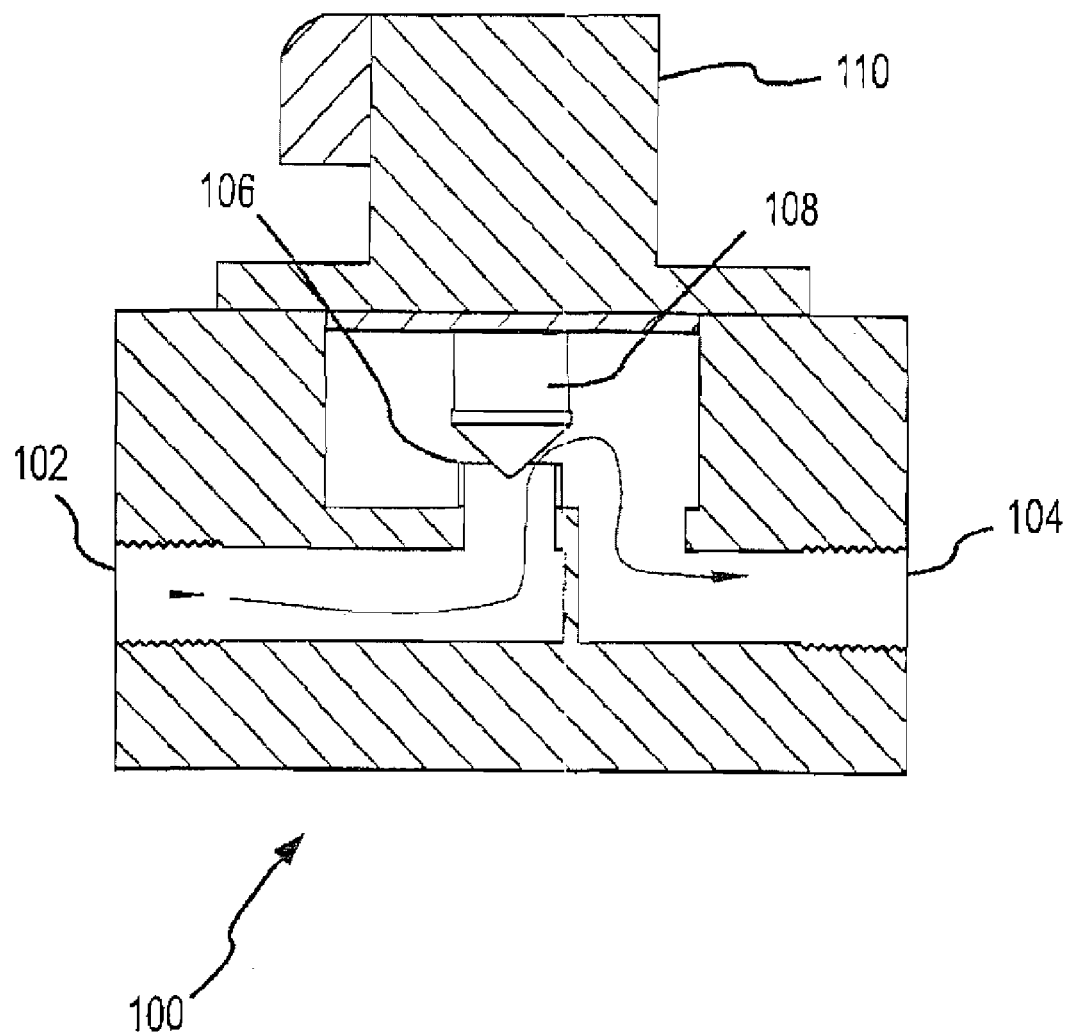
FIG. 3 illustrates one embodiment of a leaning valve utilized with the system of FIG. 1.

FIG. 3 shows one embodiment of the leaning valve 100. In the embodiment shown, the inlet 102 of the leaning valve 100 receives gas flow from the outlet 56 of the boost pressure valve 50. As shown, the leaning valve 100 has an inlet 102, an outlet 104, a valve seat 106, and a needle assembly 108. Interconnected to the needle valve 108 is a stepper motor 110. The stepper motor 110 is operative to, in response to signals received from the ECU 80, adjust the position of the needle assembly 108 in order to vary the volume of gaseous-fuel flow (i.e., as received from the boost-pressure valve 50) through the leaning valve 100 prior to being received by the air intake 36. In this regard, it should be noted that at high loads, dual-fuel fumigation systems often suffer from a lack of power. This is due in part to the fact that most gaseous-fuels contain less thermal energy than diesel fuel. Accordingly, at high loads the gaseous-fuel may not provide enough BTUs to the diesel engine 20 for efficient operation. In this regard, the flow of the gaseous-fuel may be restricted by the leaning valve 100.

That is, at high loads, the boost-pressure valve 50 is fully opened and the gaseous-fuel flow may be leaned to provide improved engine performance (i.e., resulting in higher diesel usage to maintain power output). Furthermore, the leaning valve 100 may be utilized to fine-tune the gaseous-fuel flow in order to achieve desired emission outputs. Of note, at such high load conditions, elevated temperature and pressure in the engine during the compression strokes of the pistons may make the intake air/gaseous-fuel mixture susceptible to premature detonation (i.e., engine knocking). Such engine knocking is an uncontrolled combustion process that can damage the engine. While such engine knocking may initially be of low intensity, oscillation (e.g., harmonic amplification) may occur resulting in the engine shaking an/or bouncing (i.e., rough engine operation). Discussed herein are systems and methods to reduce and/or eliminate such engine knocking.

As noted, the leaning valve 100 is operated by the ECU 80. In one arrangement, the ECU 80 utilizes the oxygen sensor 84, which is disposed in the exhaust output 38 of the engine 20, to generate control signals for adjusting the leaning valve 100. In this regard, the oxygen content of the exhaust gases is monitored by the oxygen sensor 84. The oxygen sensor 84 generates a signal based on this oxygen content, which signal is transmitted to the ECU 80. The ECU 80 may comprise any computer, logic, firmware, computer chip, microprocessor, and/or circuit board. In any case, the ECU 80 controls the operation of the leaning valve 100 in relation to the received oxygen signal. Accordingly, the ECU 80 monitors the signal from the oxygen sensor 84 at a predetermined rate.

Upon receipt of an oxygen signal showing an amount of oxygen below a desired amount in the exhaust conduit 38, the ECU 80 sends a control signal to the leaning valve 100, thereby causing the leaning valve 100 to advance the needle assembly 108 towards the valve seat 106, which provides a reduced gaseous-fuel flow to the air intake 36. Accordingly, this reduced gaseous-fuel flow to the air intake results in a leaner gaseous-fuel/intake air mixture. Conversely, upon receipt of an oxygen content signal showing an excess of oxygen in the exhaust conduit 38, the ECU 80 sends a control signal to the leaning valve 100 causing the needle assembly 108 to be opened relative to the valve seat 106. This causes an increased gaseous-fuel flow and thereby a richer gaseous-fuel/intake air mixture to be provided to the engine 20.

Another feature of the illustrated fumigation system 10 is the ability for a user to selectively control an oxygen set point for the ECU 80. That is, a user may control the oxygen content of the exhaust gas. In this regard, the ECU 80 includes an exhaust oxygen content adjuster 82 that may be set by a user to establish a desired oxygen content in the exhaust gases. As will be appreciated, engines from different manufacturers may run at different consumption and/or power levels. This is true even for engines having the same power rating (e.g., horsepower). For example, one 300 hp rated engine may run at 25 cubic feet of intake air per second, whereas another 300 hp rated engine may utilize 50 cubic feet of air per second. Likewise, these engines may have varying boost-pressure levels. Furthermore, there may also be variations in the thermal energy of the gaseous-fuel utilized with these engines. For example, there may be thermal energy and/or combustion differences between propane and natural gas. In this regard, the ability to select an oxygen level for the exhaust gases of a particular engine allows for adjusting the fumigation system 10 in accordance with a particular set of operating conditions that may be engine specific.

The oxygen sensor 84 allows the ECU 80 to ensure that the fuel provided to the engine 20 (i.e., diesel fuel and the gaseous-fuel) is more fully combusted. That is, if the oxygen level in the exhaust conduit 38 drops below a predetermined minimum, it is known that there is not enough oxygen within the intake air/gaseous-fuel mixture to completely combust the fuel. In this instance, fuel is being utilized inefficiently and hydrocarbons are passing unburned through the engine 20, which results in increased emissions. Accordingly, by adjusting the flow of the gaseous-fuel such that a predetermined minimum oxygen level is maintained within the exhaust output 38, more complete combustion of the diesel fuel and gaseous-fuel mixture is realized and emissions may be reduced.

Though the ECU 80 is discussed as being operable to control the fumigation system 10 with only a sensor input from the oxygen sensor 84, additional and /or different sensors may be utilized control the fumigation system and/or to enhance performance of the engine. For example, an exhaust gas temperature gauge 88 and RPM sensor 92 may be incorporated into the system 10 to control and/or fine-tune the operation of the fumigation system 10.

As noted above, in some instances an engine utilizing the gaseous-fuel fumigation system may experience engine knocking conditions. In order to identify such engine knocking conditions, the gaseous-fuel fumigation system also includes at least a first knock sensor 86 that is operatively connected to the engine 20. See FIG. 1. Further, it will be appreciated that a plurality of such knock sensors 86 may be utilized. The knock sensor 86 may take the form of an accelerometer (e.g., a piezoelectric sensor) that is attached to a solid surface of the engine 20 to provide feedback signals to the ECU 80. What is important is that the knock sensor be operative to generate an output that is indicative of engine motion (e.g., vibrations).

Generally, the knock sensor(s) may be attached to any location that provides a solid base though which engine vibrations may be detected. Such locations include, without limitation, the engine block and/or cylinder head. In one arrangement, knock sensors 86 may be disposed adjacent to each cylinder of the engine 20. It is intended that knock sensors 86 detect high motion frequency oscillations of pressure in the cylinders of engine 20 that can lead to mechanical breakdown of engine 20. As will be appreciated, all diesel engines produce a "rattling" sound when running. This is caused when the diesel fuel ignites upon injection into the combustion chamber. That is, the rapid combustion of the diesel fuel and intake air produces very high pressures generating a rumble or dull clattering sound. Accordingly, for purposes of identifying knocking conditions, it is engine motion/vibration (e.g., engine knocking) above the motion/vibration caused by the rattling of the diesel engine that needs to be identified by the knock sensor 86 and the ECU 80.

To identify such knocking conditions, knock sensors 86 may be connected to the engine 20 adjacent to corresponding cylinders. For each cylinder firing, the closest knock sensor 86 may be monitored over a specific time interval during which the output signals of the knock sensors are gathered/sampled by the ECU 80. That is, the ECU 80 may sample the outputs of the knock sensor(s) 86 and generate a baseline/threshold value(s) that is indicative of normal motion/vibration levels. As will be appreciated, such a threshold value may be generated utilizing a predetermined number of outputs samples of the knock sensor(s) 86. Further, such a threshold value may be continually updated. Stated otherwise, the threshold value may be a moving average. Alternatively and/or additionally, the ECU 80 may be operative to store one or more threshold values determined during operation of the engine 20 and/or utilize predetermined threshold values. For instance, such threshold values may be stored in a lookup table or other memory structure (e.g., equations) that are indexed to one or more engine operating parameters. A non-inclusive list of such parameters may include, exhaust oxygen level, engine rpm, exhaust temperature, gaseous fuel supply pressure, engine load and/or boost pressure.

Irrespective of whether the ECU 80 generates the threshold values and/or utilizes predetermined/stored threshold values, the ECU 80 is operative to compare output signals from the knock sensor(s) 86 to one or more threshold values. For instance, the ECU 80 may count the number of knock sensor outputs above a threshold value during a specific time period. If the number of outputs above the threshold value for the time period is unacceptable, remedial measures may be taken. In such circumstances, the ECU 80 adjusts the flow of gaseous fuel to the air intake 36 in response to identifying a predetermined number of outputs from the knock sensor(s) 86 that are above the threshold value (i.e., outputs indicating engine knocking conditions).

In one particular arrangement, upon identifying engine knocking conditions, the ECU 80 is operative to close the leaning valve 100 to shut off the flow of gaseous fuel to the air intake 36. Upon shutting the leaning valve 100, the ECU 80 immediately begins reopening the leaning valve 100 based on one or more current operating parameter (e.g., exhaust oxygen levels). This closing and reopening of the leaning valve 100 (i.e., cycling of the valve) allows for reestablishing proper operating conditions for the engine 20. That is, engine knocking conditions are eliminated and those conditions are generally eliminated prior to the engine oscillation (i.e., prior to visibly rough operation).

As will be appreciated, closing of the leaning valve 100 allows the engine 20 to briefly run in full diesel mode. As noted above, the cause of knocking in dual-fuel systems often stems from a lean fuel mixture at high load levels. That is, a lack of BTUs in the gaseous-fuel/intake air mixture at high load levels. Running in full diesel mode eliminates the lean fuel condition. Further, the brief operation in full diesel mode allows the boost pressure valve position to stabilize for current operating conditions as well as for oxygen levels in the exhaust stream to be established for the current operating conditions. Accordingly, when the ECU 80 reopens the leaning valve, the valve may be opened to reestablish a desired oxygen level in the exhaust stream. Due to the changes in the operating conditions, the leaning valve will typically reopen to a different position (e.g., gaseous fuel flow volume) than existed prior to the change in operating conditions. Though discussed in relation to fully closing the leaning valve 100 to correct knocking conditions, it will be appreciated that in some instances, substantially reducing the fuel flow though the leaning valve 100 may produce similar results. That is, the leaning valve 100 may, after the detection of knocking conditions, be closed to reduce gaseous fuel flow to a predetermined percentage of the pre-knocking fuel flow (e.g., 20%) and then be reopened. Such partial closure may, for some applications, be sufficient to eliminate knocking conditions and may also reducing cycling time. Accordingly such partial closure is considered within the scope of the present invention.

Figure 4:
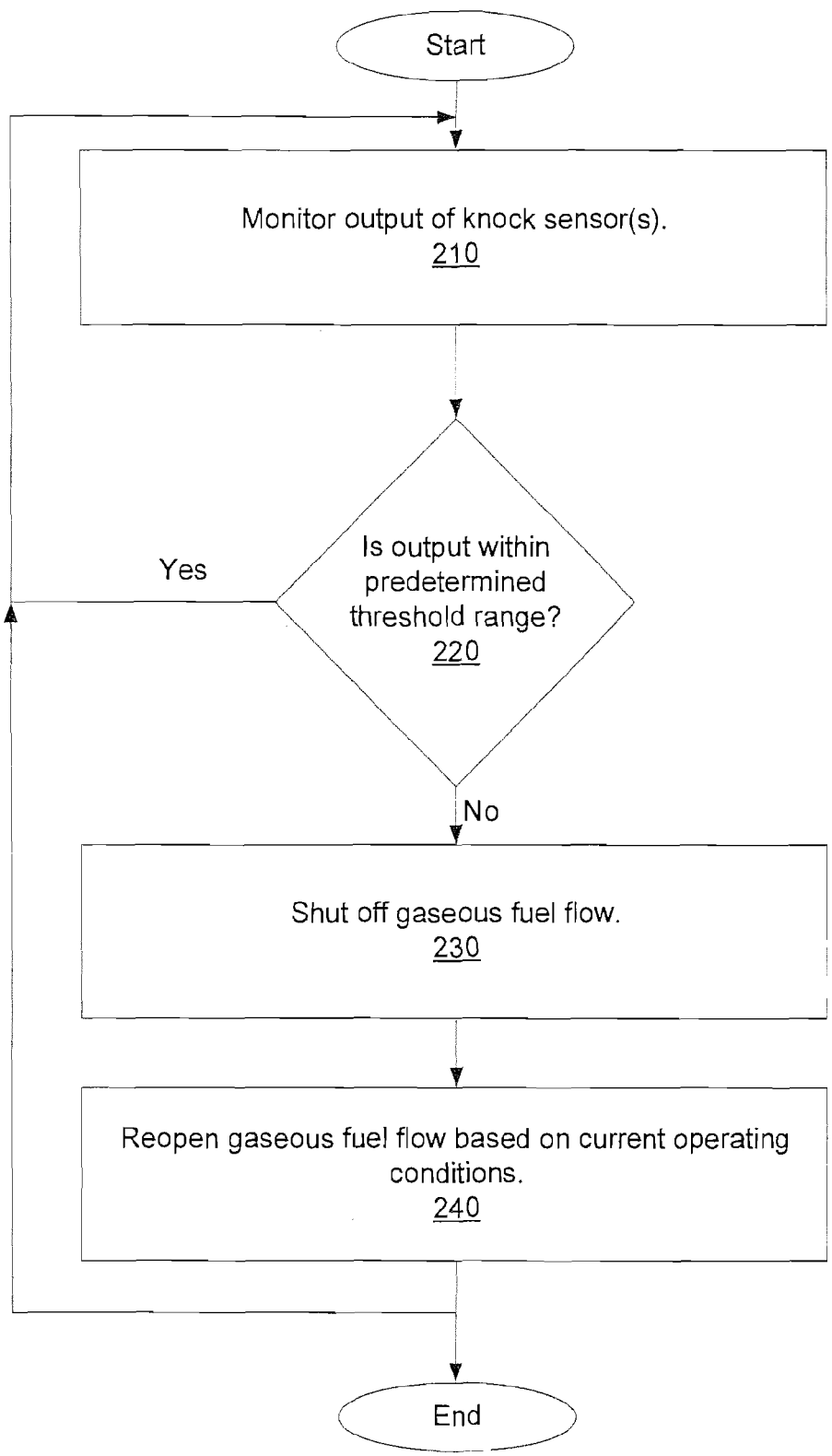
FIG. 4 illustrates a process that may be utilized with a fumigation system.

Referring to FIG. 4, a process (200) for implementing the above-noted valve cycling to counteract engine knocking conditions is provided. Initially, the ECU 80 monitors (210) the output of the knock sensor(s) 86 over a predetermined period of time. The output of the knock sensor(s) 86 is compared (210) to at least a first threshold. If the output is below or within a predetermined amount of the threshold, monitoring (200) continues. If the output is greater than the threshold or a predetermined percentage greater than the threshold (e.g., 1.2 times the threshold) it may be determined that engine knocking conditions exist. Once the determination is made that engine knocking conditions exist, the supply of gaseous fuel flow may be shut off (230) or substantially restricted to allow the engine to operate in full or near full diesel mode. Once the gaseous fuel is shut off/restricted (230) the gaseous fuel flow may be reopened (240) in accordance with current operating conditions. Likewise, monitoring (210) may continue until operation of the engine is terminated.

The foregoing description of the present invention has been presented for purposes of illustration and description. Furthermore, the description is not intended to limit the invention to the form disclosed herein. Consequently, variations and modifications commensurate with the above teachings, and skill and knowledge of the relevant art, are within the scope of the present invention. The embodiments described hereinabove are further intended to explain best modes known of practicing the invention and to enable others skilled in the art to utilize the invention in such, or other embodiments and with various modifications required by the particular application(s) or use(s) of the present invention. It is intended that the appended claims be construed to include alternative embodiments to the extent permitted by the prior art.

What is claimed is:

1. A gaseous-fuel fumigation system for use with a diesel engine, comprising:
  a first valve disposable in a flow path between a gaseous-fuel supply and an air intake stream of a diesel engine, the first valve being operative to regulate a flow volume of a gaseous-fuel through the flow path;
  a knock sensor operative to monitor a motion level of said diesel engine and generate an output signal indicative of said motion level; and
  a controller operative to:
  receive the output signal from the knock sensor;
  compare said output signal to at least a first threshold value; and
  upon said output signal exceeding said first threshold value, generate control signals operative to move said first valve between an current open position defining a first gaseous-fuel flow volume, a substantially closed position defining a second gaseous-fuel flow volume, and a reopened position defining a third gaseous-fuel flow volume.

2. The system of claim 1, wherein resulting movement of said valve from said current open position to said substantially closed position and to said reopened position is substantially continuous.

3. The system of claim 1, wherein said second flow volume is a zero gaseous-fuel flow volume.

4. The system of claim 1, wherein said first gaseous-fuel flow volume and said third gaseous-fuel flow volume are different.

5. The system of claim 1, further comprising:
an oxygen sensor operative to generate a oxygen content signal indicative of an oxygen content of an exhaust stream of the diesel engine.

6. The system of claim 5, wherein said controller is further operative to:
receive said oxygen content signal from said oxygen sensor; and
generate a control signal operative to move said first valve between said substantially closed position and said reopened position, wherein said third gaseous-fuel flow volume associated with said reopened position is based at least in part on said oxygen content signal.

7. The system of claim 1, wherein said knock sensor comprises a piezoelectric device.

8. The system of claim 1, further comprising:
a second valve disposed in the flow path between the gaseous-fuel supply and the air intake stream of the diesel engine, the second valve being operative to regulate the flow volume of a gaseous-fuel through the flow path based on a load level associated with the engine.

9. The system of claim 8, wherein said first and second valves are disposed in series.

10. The system of claim 8 wherein said second valve regulates the flow volume of gaseous-fuel in relation to a boost pressure associated with a turbocharger attached to the engine.

11. The system of claim 10, wherein the second valve is operated by the boost pressure associated with the turbocharger.

12. The system of claim 1 further comprising:
a memory structure associated with said controller, wherein said memory structure is operative to store at least one predetermined threshold value.

13. A method for use with gaseous-fuel fumigation system attached to a diesel engine, comprising:
establishing a gaseous-fuel flow through a first valve disposed between a gaseous-fuel supply and an air intake stream of a diesel engine, wherein said first valve is operative for regulating a volume said gaseous-fuel flow;
monitoring a motion level of said engine;
upon said motion level exceeding at least one threshold value, substantially closing and reopening said first valve, wherein said gaseous fuel flow to said air intake is temporarily interrupted.

14. The method of claim 13, wherein said first valve is substantially closed and reopened in a substantially continuous movement.

15. The method of claim 13, wherein monitoring further comprises:
generating an output signal from a motion sensor attached to said diesel engine, wherein said output signal is indicative of said motion level.

16. The method of claim 15, further comprising:
comparing said output signal to said at least one threshold value.

17. The method of claim 13, wherein substantially closing and reopening said first valve further comprises:
generating a first valve control signal operative to move said valve from an initial valve position defining a first gaseous-fuel flow volume to a substantially closed position defining a second gaseous-fuel flow volume; and
generating a second valve control signal operative to move said valve from said substantially closed position to a reopened position defining a third gaseous-fuel flow volume.

18. The method of claim 17, wherein said first gaseous-fuel flow volume and said third gaseous-fuel flow volume are different.

19. The method of claim 17, further comprising:
obtaining an exhaust oxygen value, wherein said third gaseous-fuel flow volume associated with said reopened position is based at least in part on said oxygen content value.

20. The method of claim 19, wherein said exhaust oxygen value is obtained after said first valve is substantially closed.

21. The method of claim 13, further comprising passing said gaseous-fuel flow through a second valve disposed between said gaseous-fuel supply and said air intake stream of said diesel engine, wherein said second valve is operative for regulating said volume said gaseous-fuel flow based on an engine load level.

22. The method of claim 21, further comprising:
operating said second valve based on a boost pressure of a turbocharger associated with said diesel engine.

23. The method of claim 13, further comprising:
generating said at least one threshold value during operation of said engine.

24. The method of claim 13, further comprising:
obtaining said threshold value from a memory structure containing a set of predetermined threshold values.

25. A gaseous-fuel fumigation system for use with a diesel engine, comprising:
a first valve disposable in a flow path between a gaseous-fuel supply and an air intake stream of a diesel engine, the first valve being operative to regulate a flow volume of a gaseous-fuel through the flow path;
a knock sensor operative to monitor a motion level of said diesel engine and generate an output signal indicative of said motion level;
an oxygen sensor disposed in an exhaust stream of said diesel engine and being operative to generate an oxygen content signal; and
a controller operative to:
receive the output signal from the knock sensor and the oxygen content signal from the oxygen sensor; and
compare said output signal to at least a first threshold value; and
upon said output signal exceeding said first threshold value, generate a first control signal operative to close said first valve and generate a second control signal operative reopen said first valve, wherein said second control signal is based at least in part on said oxygen content signal.

* * * * *